(12) United States Patent
Ku

(10) Patent No.: US 8,570,620 B2
(45) Date of Patent: Oct. 29, 2013

(54) LIGHT SCANNING UNIT AND ELECTROPHOTOGRAPHIC IMAGE FORMING APPARATUS USING THE SAME

(75) Inventor: Jong-Wuk Ku, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 457 days.

(21) Appl. No.: 12/923,365

(22) Filed: Sep. 16, 2010

(65) Prior Publication Data

US 2011/0080624 A1    Apr. 7, 2011

(30) Foreign Application Priority Data

Oct. 7, 2009    (KR) .................. 10-2009-0095132

(51) Int. Cl.
*H04N 1/04*    (2006.01)

(52) U.S. Cl.
USPC .................... 358/475; 359/204.5; 359/207.11

(58) Field of Classification Search
None
See application file for complete search history.

(56) References Cited

U.S. PATENT DOCUMENTS

| | | | |
|---|---|---|---|
| 2003/0071203 A1 | 4/2003 | Inagaki | |
| 2003/0107788 A1* | 6/2003 | Hayashi et al. | 359/205 |
| 2004/0233821 A1* | 11/2004 | Saitoh et al. | 369/112.05 |
| 2006/0114772 A1* | 6/2006 | Egawa et al. | 369/44.23 |
| 2007/0253048 A1* | 11/2007 | Sakai et al. | 359/204 |
| 2008/0100895 A1* | 5/2008 | Hayashi et al. | 359/204 |

FOREIGN PATENT DOCUMENTS

| | | |
|---|---|---|
| EP | 0 286 368 A2 | 10/1988 |
| EP | 0 585 867 A2 | 3/1994 |
| EP | 2 053 446 A1 | 4/2009 |
| JP | 57-22218 | 2/1982 |

OTHER PUBLICATIONS

European Search Report dated Dec. 29, 2010 in corresponding European Patent Application 10176475.1.

* cited by examiner

*Primary Examiner* — Twyler L. Haskins
*Assistant Examiner* — Helen Q Zong
(74) *Attorney, Agent, or Firm* — Staas & Halsey LLP (57) ABSTRACT

A light scanning unit and an electrophotographic image forming apparatus using the same. The light scanning unit uses a reduced number of optical components by forming an optical unit disposed between a light source and an optical deflector by using only a single lens and ensures optical and mechanical properties by having an appropriate main/sub scanning magnification ratio.

18 Claims, 4 Drawing Sheets

LIGHT SCANNING UNIT AND ELECTROPHOTOGRAPHIC IMAGE FORMING APPARATUS USING THE SAME

CROSS-REFERENCE TO RELATED APPLICATIONS

This application claims the benefit of Korean Patent Application No. 10-2009-0095132, filed on Oct. 7, 2009, in the Korean Intellectual Property Office, the disclosure of which is incorporated herein in its entirety by reference.

BACKGROUND

1. Field

The disclosure relates to a light scanning unit and an electrophotographic image forming apparatus using the same.

2. Description of the Related Art

A light scanning unit is a unit for scanning light emitted from a light source onto a predetermined region and is used in various devices such as electrophotographic image forming apparatuses and scanning display devices.

For example, in an electrophotographic image forming apparatus, if a light scanning unit scans a light beam onto a photoreceptor such as a photosensitive drum, via main scanning performed by the light scanning unit and sub scanning performed due to movement of the photoreceptor, an electrostatic latent image is formed on the photoreceptor. The formed electrostatic latent image is developed into a development image by using a developer such as a toner, and the development image is transferred onto a printing medium.

A light scanning unit includes an optical deflector for deflecting a light beam emitted from a light source and scanning the light beam onto a photoreceptor, and an optical unit (lens) for refracting a light beam emitted from a light source and imaging the light beam. Examples of the optical unit of the light scanning unit include a collimating lens for collimating a light beam emitted from a light source, a cylindrical lens for focusing a light beam onto a reflection surface of the optical deflector in a sub scanning direction, and a scanning lens for imaging a light beam scanned by the optical deflector on the photoreceptor.

SUMMARY

According to an aspect, there is provided a light scanning unit including a light source for emitting a light beam; an optical deflector for deflecting and scanning the light beam emitted from the light source in a main scanning direction; a first optical unit comprising a single lens, being disposed between the light source and the optical deflector, and for collimating the light beam emitted from the light source in the main scanning direction and focusing the light beam onto a reflection surface of the optical deflector in a sub scanning direction; and a second optical unit comprising at least one lens and for imaging the light beam deflected and scanned by the optical deflector onto a scanning target surface, wherein $|\beta m|>|\beta s|$ is satisfied, where, $\beta m$ represents a magnification of an optical system of the light scanning unit in the main scanning direction, and $\beta s$ represents a magnification of the optical system of the light scanning unit in the sub scanning direction.

According to another aspect, there is provided an electrophotographic image forming apparatus including a photoreceptor; a light scanning unit for scanning a light beam onto a scanning target surface of the photoreceptor so as to form an electrostatic latent image; and a developing unit providing a toner to the electrostatic latent image formed by the photoreceptor so as to develop the electrostatic latent image.

The light scanning unit may satisfy $0.05<(\beta s/\beta m)^2<0.5$

The first optical unit may include an anamorphic lens.

The first optical unit may be formed of plastic.

A diffraction pattern may be formed on at least one surface of the first optical unit.

The diffraction pattern of the first optical unit may be formed in a saw-toothed shape or a stair shape.

A diffraction surface of the first optical unit, on which the diffraction pattern is formed, may have a circular shape or an oval shape.

The diffraction pattern of the first optical unit may be represented by using $$\phi(r) = \frac{2\pi}{m\lambda}(c_1 r^2 + c_2 r^4 + c_3 r^6 + c_4 r^8),$$

where $\phi$ represents a phase of the diffraction pattern in a region at a distance r from a center of the diffraction surface, m represents a diffraction order, $\lambda$ represents a wavelength of the light beam emitted from the light source, and $c_1$, $c_2$, $c_3$, and $c_4$ represent coefficients of the phase polynomial expression.

The light scanning unit may further include a slit for shaping the light beam.

Additional aspects and/or advantages will be set forth in part in the description which follows and, in part, will be apparent from the description, or may be learned by practice of the embodiments.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, the present invention will be described in detail by explaining embodiments of the invention with reference to the attached drawings. The invention may, however, be embodied in many different forms and should not be construed as being limited to the embodiments set forth therein; rather, these embodiments are provided so that this disclosure will be thorough and complete, and will fully convey the concept of the invention to one of ordinary skill in the art. In the drawings, like reference numerals denote like elements and the size of each element may be exaggerated for clarity and convenience of explanation.

Figure 1:
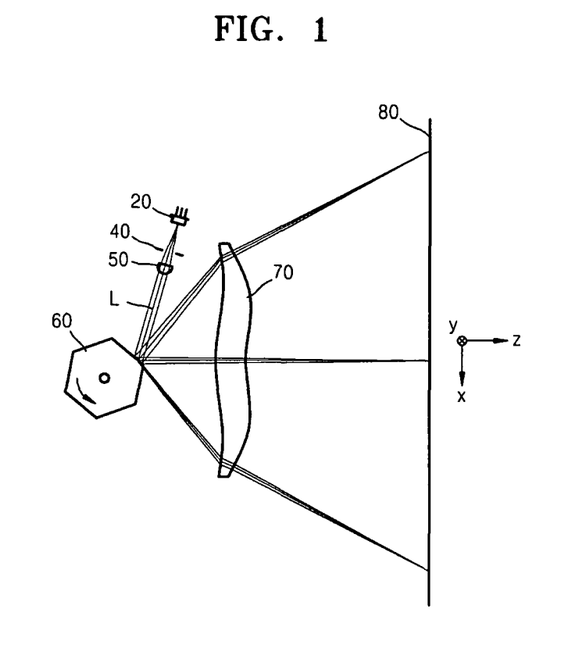
FIG. 1 is a schematic view showing an optical configuration of a light scanning unit with respect to a main scanning plane, according to an embodiment.
Figure 2:
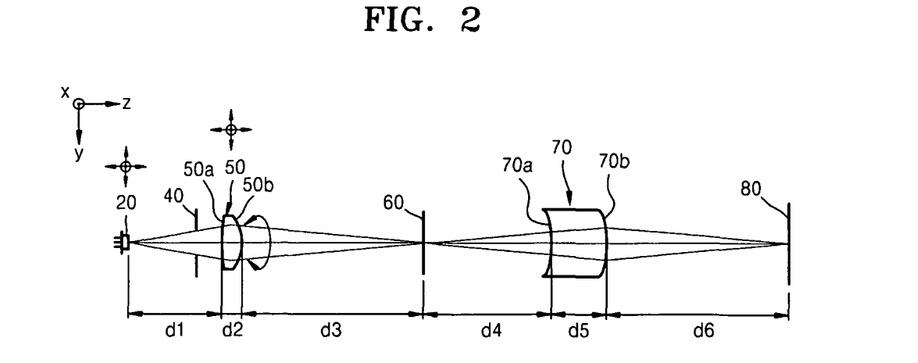
FIG. 2 is a schematic view showing an optical configuration of the light scanning unit illustrated in FIG. 1 with respect to a sub scanning plane.

FIG. 1 is a schematic view showing an optical configuration of a light scanning unit with respect to a main scanning plane, according to an embodiment. FIG. 2 is a schematic view showing an optical configuration of the light scanning unit illustrated in FIG. 1 with respect to a sub scanning plane. Here, the main scanning plane is a plane in which light beams are scanned in a main scanning direction, and the sub scanning plane is a plane perpendicular to the main scanning direction. In FIG. 2, for convenience of explanation, a light beam deflected by a beam deflector is illustrated as if the light beam proceeds undeflected.

Referring to FIGS. 1 and 2, the light scanning unit includes a light source 20 for emitting a light beam L, a slit 40, a first optical unit 50, an optical deflector 60 and a second optical unit 70.

The light source 20 emits the light beam L. For example, a semiconductor laser diode for emitting a laser beam may be used as the light source 20.

The slit 40 shapes the light beam L emitted from the light source 20 and may have an opening having, e.g., a circular shape or an oval shape. Although the slit 40 is disposed between the light source 20 and the first optical unit 50 in FIGS. 1 and 2, the position of the slit 40 is not limited thereto. For example, the slit 40 may be disposed between the first optical unit 50 and the optical deflector 60. Furthermore, the slit 40 may be omitted.

The first optical unit 50 is disposed between the light source 20 and the optical deflector 60, collimates the light beam L emitted from the light source 20 in a main scanning direction x, and focuses the light beam L onto a reflection surface of the optical deflector 60 in a sub scanning direction y. The first optical unit 50 may include a single anamorphic lens. The first optical unit 50 performs functions of both a collimating lens and a cylindrical lens, which are separately included in a conventional light scanning unit. The first optical unit 50 may be formed of plastic. Here, the main scanning direction x is a direction in which the light beam L is scanned with respect to a scanning target surface 80, and the sub scanning direction y is a direction perpendicular to the main scanning direction x with respect to the scanning target surface 80 and is identical to a rotation axis of the optical deflector 60.

Figure 3:
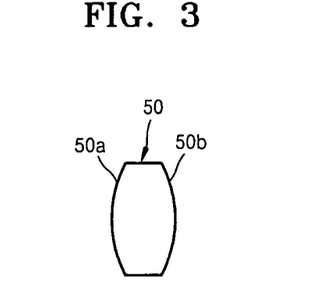
FIG. 3 is a schematic side view of a first optical unit used in the light scanning unit illustrated in FIG. 1, according to an embodiment.

FIG. 3 is a schematic side view of the first optical unit 50 illustrated in FIG. 1, according to an embodiment.

Referring to FIG. 3, at least one of an incident surface 50a and an exit surface 50b of the first optical unit 50 may be formed as a curved surface having different refraction powers with respect to the main and sub scanning directions.

Figure 4A:
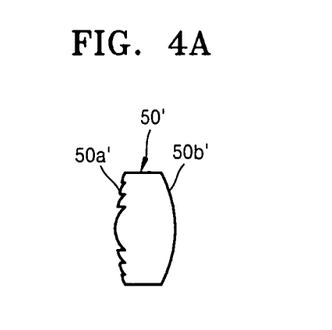
FIG. 4A is a schematic side view of a first optical unit used in the light scanning unit illustrated in FIG. 1, according to another embodiment.
Figure 4B:
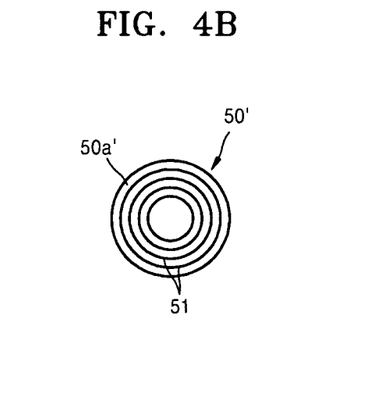
FIG. 4B is a schematic view showing a diffraction surface of the first optical unit illustrated in FIG. 4A.

FIG. 4A is a schematic side view of a first optical unit 50', according to another embodiment. FIG. 4B is a schematic view showing a diffraction surface of the first optical unit 50' illustrated in FIG. 4A.

Referring to FIGS. 4A and 4B, a diffraction pattern 51 is formed on an incident surface 50a' of the first optical unit 50'. The diffraction pattern 51 may be formed in a saw-toothed shape or a stair shape.

The diffraction pattern 51 may be represented by using a phase polynomial expression of Expression 1.

$$\phi(r) = \frac{2\pi}{m\lambda}(c_1 r^2 + c_2 r^4 + c_3 r^6 + c_4 r^8),$$ [Expression 1]

where $\phi$ represents a phase of the diffraction pattern 51 in a diffraction region in which the diffraction pattern 51 is formed, i.e., a phase of the diffraction pattern 51 in a region at a distance r from a center of the diffraction surface, m represents a diffraction order, $\lambda$ represents a wavelength of the light beam L emitted from the light source 20 illustrated in FIG. 1, and $c_1$, $c_2$, $c_3$, and $c_4$ represent coefficients of the phase polynomial expression.

Although the diffraction surface has a circular shape in FIG. 4B, the shape of the diffraction surface is not limited thereto. For example, the diffraction surface may have an oval shape. Also, although the diffraction pattern 51 is formed on the incident surface 50a' of the first optical unit 50' in FIGS. 4A and 4B, the surface where the diffraction pattern 51 is formed is not limited thereto and the diffraction pattern 51 may be formed on at least one of the incident surface 50'a and the exit surface 50'b of the first optical unit 50'.

Referring back to FIGS. 1 and 2, the optical deflector 60 scans the light beam L onto the scanning target surface 80 in the main scanning direction x. For example, a rotary polygon mirror having a plurality of reflection surfaces may be used as the optical deflector 60. The light beam L emitted from the light source 20 is deflected and reflected on the reflection surface of the optical deflector 60 toward the scanning target surface 80, and is scanned in the main scanning direction x as the optical deflector 60 rotates. As another example of the optical deflector 60, a mirror scanner may be realized by a micro electro-mechanical system.

The second optical unit 70 is an optical system for imaging the light beam L scanned by the optical deflector 60, on the scanning target surface 80, and is disposed between the optical deflector 60 and the scanning target surface 80. The second optical unit 70 may be formed of plastic. The second optical unit 70 may have an aspherical surface that modifies the light beam L scanned by the optical deflector 60 in such a way as to be scanned onto the scanning target surface 80 at a constant speed with respect to the main scanning direction x. Also, the second optical unit 70 allows the light beam L to be focused on the reflection surface of the optical deflector 60 and the scanning target surface 80 with respect to the sub scanning direction y. As such, the second optical unit 70 may compensate for a shake of a rotation axis of the optical deflector 60 by making a conjugation relation between the reflection surface of the optical deflector 60 and the scanning target surface 80. Although the second optical unit 70 includes a single lens in FIGS. 1 and 2, two or more lens may be included. A reflection mirror (not shown) for appropriately modifying an optical path may be further included between the second optical unit 70 and the scanning target surface 80.

Meanwhile, the light scanning unit according to the current embodiment is different from a conventional light scanning unit separately including a collimating lens and a cylindrical lens in that the first optical unit 50 includes a single lens. In the conventional light scanning unit, an imaging position in the main scanning direction x and an imaging position in the sub scanning direction y are independently adjusted by separately adjusting positions of the collimating lens and the cylindrical lens with respect to an optical axis. On the other hand, in the light scanning unit according to the current embodiment, the first optical unit 50 performs functions of both a collimating lens and a cylindrical lens by using a single lens, and an imaging position in the main scanning direction x and an imaging position in the sub scanning direction y may not be independently adjusted with ease. Accordingly, in the current embodiment, magnifications of an optical system of the light scanning unit are designed to satisfy Expression 2.

$$|\beta m| > |\beta s|, \quad \text{[Expression 2]}$$

where, βm represents a magnification of the optical system of the light scanning unit in the main scanning direction x, and βs represents a magnification of the optical system of the light scanning unit in the sub scanning direction y.

Furthermore, the first and second optical units 50 and 70 may be designed so that the magnifications of the optical system of the light scanning unit satisfy Expression 3.

$$0.05 < (\beta s/\beta m)^2 < 0.5 \quad \text{[Expression 3]}$$

If the optical system of the light scanning unit satisfies Expression 2 and further satisfies Expression 3, a magnification ratio between magnifications in main scanning and sub scanning directions x and y is relatively small in comparison to that of the conventional light scanning unit and thus tolerance sensitivity in the sub scanning direction y may be reduced. As such, optical and mechanical properties of the light scanning unit may be ensured. For example, even when the first optical unit 50 is positioned with reference to only a spot of the light beam L in the main scanning direction x, the first optical unit 50 may be disposed within a tolerance range in the light scanning unit. Also, while the first optical unit 50 is positioned with reference to the spot of the light beam L in the main scanning direction x, the first optical unit 50 may be sufficiently fixed on a frame (not shown) of the light scanning unit by using, for example, a bonding agent and thus an additional adjustment member is not necessary. In this case, the first optical unit 50 may be positioned by moving the first optical unit 50 in a vertical direction, a horizontal direction, or a beam proceeding direction and by additionally rotating along the beam proceeding direction around an axis. Furthermore, the spot of the light beam L may be more precisely adjusted by moving the light source 20 in the vertical direction, the horizontal direction, or the beam proceeding direction. The light source 20 may also be positioned with reference to the spot of the light beam L in the main scanning direction x without an additional adjustment member and then may be fixed on the frame of the light scanning unit by using, for example, a bonding agent.

Examples of design conditions for the optical system of the light scanning unit will now be described.

Example 1

Table 1 shows a design condition in the optical configuration of the optical system of the light scanning unit illustrated in FIGS. 1 and 2.

TABLE 1

| | |
|---|---|
| n | 1.526248 |
| d1 | 14.43 |
| d2 | 3 |
| d3 | 43.65 |
| d4 | 29.2 |
| d5 | 13.5 |
| d6 | 90.63 |
| R1 | 22.46 |
| R2 (Main Scanning) | −11.4871 |
| R2 (Sub Scanning) | −8.055 |

TABLE 1-continued

| | |
|---|---|
| R3 (Main Scanning) | 62.5588 |
| R3 (Sub Scanning) | −13.037 |
| R4 (Main Scanning) | 130.6980 |
| R4 (Sub Scanning) | −9.466 |
| Reference Wavelength λ | 786.5 nm |

Here, n represents a refractive index of the first and second optical units 50 and 70, each of d1 through d6 represent a distance between the light source 20 and the scanning target surface 80 or a thickness of an element therebetween as illustrated in FIG. 2, R1 represents a curvature radius of the incident surface 50a of the first optical unit 50, R2 represents a curvature radius of the exit surface 50b of the first optical unit 50, R3 represents a curvature radius of an incident surface 70a of the second optical unit 70, R4 represents a curvature radius of an exit surface 70b of the second optical unit 70, and the reference wavelength λ represents a wavelength of the light beam L emitted from the light source 20. In Table 1, values other than the refractive index n and the reference wavelength λ are represented in millimeters (mm).

In Example 1, βm is 8.9 and βs is 5.52, and thus the condition of Expression 2 is satisfied. Since $(\beta s/\beta m)^2$ is 0.38, the condition of Expression 3 is also satisfied.

Figure 5:
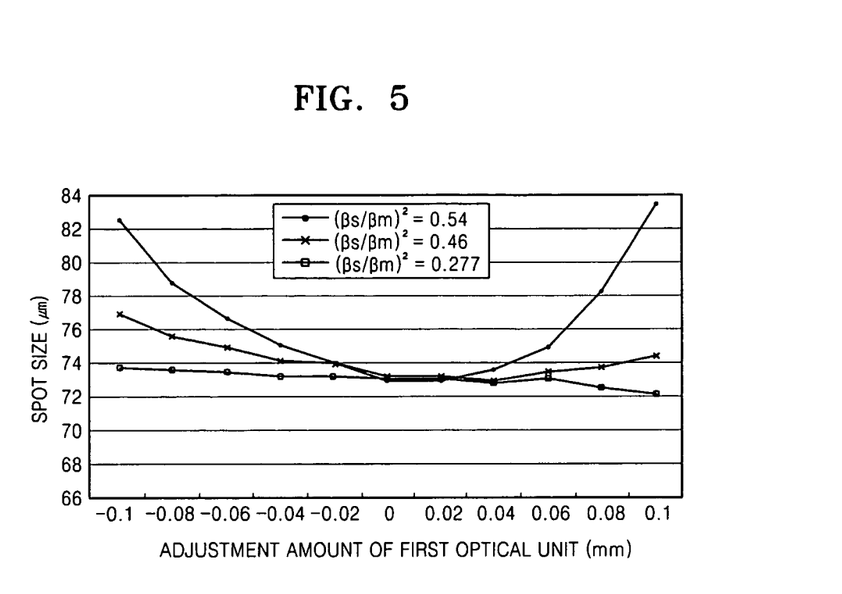
FIG. 5 is a graph showing variations in sub scanning beam diameter according to position adjustment in main/sub scanning directions of a first optical unit with respect to a magnification ratio of an optical system of a light scanning unit, according to an embodiment.

Table 2 shows variations in spot size in the sub scanning direction y according to an adjustment amount of the first optical unit 50 with respect to different values of $(\beta s/\beta m)^2$ when the first optical unit 50 is initially positioned so that the light beam L is focused on the scanning target surface 80 in the main scanning direction x. FIG. 5 is a graph showing the variations in spot size in the sub scanning direction y. Here, the adjustment amount of the first optical unit 50 refers to a value when the first optical unit 50 is moved in a proceeding direction z of the light beam L.

TABLE 2

| Adjustment Amount of First Optical Unit (mm) | Spot Size in Sub Scanning Direction (μm) | | |
|---|---|---|---|
| | $(\beta s/\beta m)^2 = 0.277$ | $(\beta s/\beta m)^2 = 0.46$ | $(\beta s/\beta m)^2 = 0.54$ |
| −0.1 | 73.61557 | 76.86981 | 82.43079 |
| −0.08 | 73.48581 | 75.53336 | 78.69486 |
| −0.06 | 73.31929 | 74.88014 | 76.57128 |
| −0.04 | 73.10199 | 74.08765 | 74.95371 |
| −0.02 | 73.11108 | 73.90683 | 73.96208 |
| 0 | 73.11178 | 73.10418 | 72.96448 |
| 0.02 | 73.10255 | 73.13582 | 72.88596 |
| 0.04 | 72.67565 | 72.87526 | 73.55712 |
| 0.06 | 73.05033 | 73.38095 | 74.91701 |
| 0.08 | 72.41237 | 73.64846 | 78.1458 |
| 0.1 | 72.11411 | 74.37137 | 83.30137 |

Referring to Table 2 and FIG. 5, if $(\beta s/\beta m)^2$ is large, e.g., 0.54, when the first optical unit 50 is moved in the proceeding direction z, the spot size in the sub scanning direction y, i.e., a beam diameter, varies greatly and thus tolerance sensitivity of the first optical unit 50 in the sub scanning direction y is large. On the other hand, if $(\beta s/\beta m)^2$ is small, e.g., 0.46, even when the first optical unit 50 is moved in the proceeding direction z of the light beam L, the spot size in the sub scanning direction y does not vary greatly and thus the tolerance sensitivity of the first optical unit 50 in the sub scanning direction y is small. If $(\beta s/\beta m)^2$ is smaller, e.g., 0.277, the tolerance sensitivity of the first optical unit 50 in the sub scanning direction y becomes smaller. As such, if the optical system of the light scanning unit satisfies Expressions 2 and 3, the tolerance sensitivity of the first optical unit 50 in the sub scanning direction y is small, even though the first optical unit 50 is positioned with reference to a spot of the light beam L in the main scanning direction x when the first optical unit 50 is disposed, a preset variation allowance amount of a beam diameter may be satisfied and thus an adjustment problem that may occur when the first optical unit 50 includes a single lens may be solved.

Example 2

Table 3 shows a design condition in the optical configuration of the optical system of the light scanning unit illustrated in FIGS. 1 and 2 when the first optical unit 50' illustrated in FIGS. 4A and 4B has a diffraction surface.

TABLE 3

| | |
|---|---|
| n | 1.526248 |
| d1 | 14.43 |
| d2 | 3 |
| d3 | 58.8 |
| d4 | 38.5 |
| d5 | 15 |
| d6 | 95.23 |
| R1 | −33 |
| R2 (Main Scanning) | −11.5335 |
| R2 (Sub Scanning) | −8.9764 |
| R3 (Main Scanning) | 62.6599 |
| R3 (Sub Scanning) | −9.21 |
| R4 (Main Scanning) | 88.5841 |
| R4 (Sub Scanning) | −9.324 |
| Reference Wavelength λ | 786.5 nm |

Meanwhile, the diffraction surface of the first optical unit 50' has the diffraction pattern 51 that satisfies Expression 1, is formed on the incident surface 50a', and satisfies values represented in Table 4.

TABLE 4

| Phase Term (Diffraction Order m = 1) | |
|---|---|
| C1 | −0.019878192196 |
| C2 = C3 = C4 | 0 |

In Example 2, βm is 10.98 and βs is 5.19, and thus the condition of Expression 2 is satisfied. Since $(\beta s/\beta m)^2$ is 0.22, the condition of Expression 3 is also satisfied.

Figure 6:
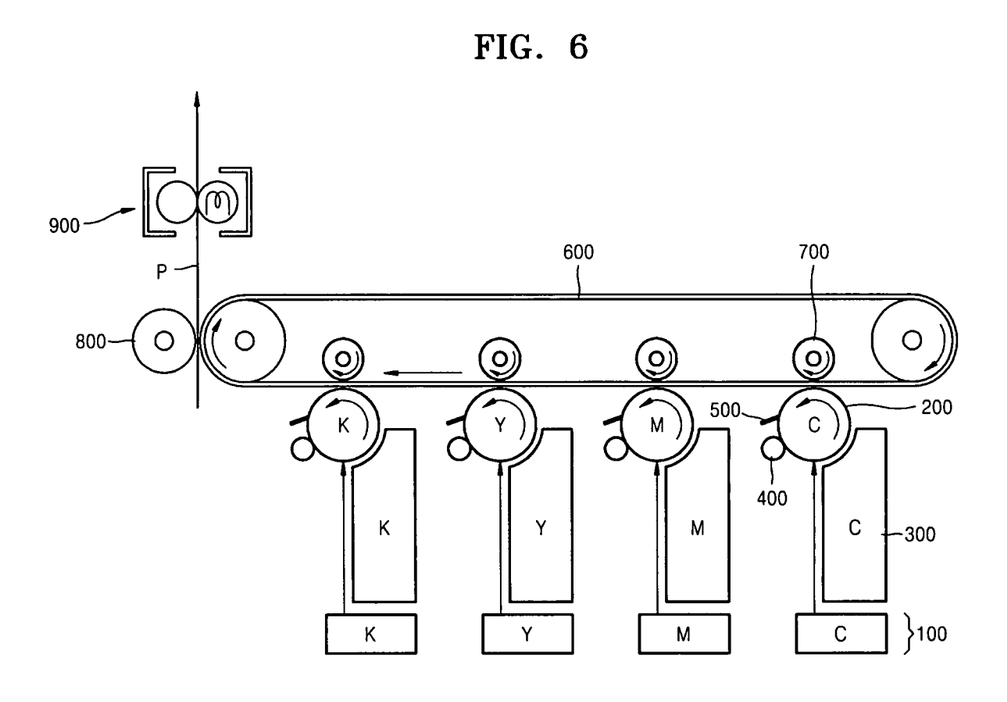
FIG. 6 is a schematic structural view of an electrophotographic image forming apparatus using a light scanning unit, according to an embodiment.

FIG. 6 is a schematic structural view of an electrophotographic image forming apparatus using a light scanning unit 100, according to an embodiment of the present invention.

Referring to FIG. 6, the electrophotographic image forming apparatus may include the light scanning unit 100, a photosensitive drum 200, a developing unit 300, a primary charge roller 400, a cleaning unit 500, an intermediate transfer belt 600, first and second transfer rollers 700 and 800, and a fusing unit 900.

In order to print a color image, the light scanning unit 100, the photosensitive drum 200, and the developing unit 300 may be included for each color. The light scanning unit illustrated in FIGS. 1 and 2 may be used as the light scanning unit 100. Four light scanning units 100 separately scan four light beams onto four photosensitive drums 200. The photosensitive drum 200 is an example of a photoreceptor and includes a cylindrical metal pipe having an outer circumference on which a photosensitive layer is formed having a predetermined thickness. Although not shown in FIG. 6, a photosensitive belt may be used as the photoreceptor. The outer circumference of the photosensitive drum 200 is a scanning target surface. The primary charge roller 400 rotates and contacts the photosensitive drum 200 and is an example of a charger for charging the surface of the photosensitive drum 200 to a uniform potential. A charge bias is applied to the primary charge roller 400. A corona charger (not shown) may be used instead of the primary charge roller 400. The light scanning unit 100 scans a light beam modulated according to image information in a main scanning direction so as to form an electrostatic latent image on the scanning target surface of the photosensitive drum 200. In this case, the scanning target surface moves in a sub scanning direction as the photosensitive drum 200 rotates, and the light scanning unit 100 is synchronized with a horizontal synchronization signal to scan a light beam onto the scanning target surface in the main scanning direction. Accordingly, a two-dimensional electrostatic latent image is formed on the scanning target surface of the photosensitive drum 200.

Electrostatic latent images corresponding to image information of four colors such as black (K), magenta (M), yellow (Y), and cyan (C) are separately formed on the four photosensitive drums 200. The four developing units 300 separately provide toners of K, M, Y, and C to the photosensitive drums 200 so as to form toner images of K, M, Y, and C. The intermediate transfer belt 600 moves while contacting the four photosensitive drums 200. The toner images of K, M, Y, and C, which are formed on the photosensitive drums 200, are transferred onto the intermediate transfer belt 600 while overlapping each other due to a first transfer bias applied to the first transfer rollers 700. The toner images remaining after being transferred are removed by the cleaning unit 500. The toner images transferred onto the intermediate transfer belt 600 are transferred onto a recording medium P due to a second transfer bias applied to the second transfer roller 800. The toner images transferred onto the recording medium P are fused on the recording medium P due to heat and pressure provided by the fusing unit 900, thereby completing a printing operation.

As described above, according to the embodiments, tolerance sensitivity in a sub scanning direction may be reduced as magnifications of an optical system of a light scanning unit satisfies a predetermined main/sub scanning magnification ratio, and optical components may be easily positioned as a first optical unit including a single lens collimates a light beam in a main scanning direction and focuses the light beam onto a reflection surface of an optical deflector in the sub scanning direction. Furthermore, as the tolerance sensitivity in the sub scanning direction is reduced when the optical components are positioned, reduction in yield rate when the first optical unit is disposed in the light scanning unit may be suppressed and an additional adjustment member for adjusting the position of a light source etc. is not required.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A light scanning unit comprising:
   a light source to emit a light beam;
   an optical deflector to deflect and scan the light beam emitted from the light source in a main scanning direction;
   a first optical unit comprising a single lens to collimate the light beam emitted from the light source in the main scanning direction and focus the light beam onto a reflection surface of the optical deflector in a sub scanning direction, the first optical unit being disposed between the light source and the optical deflector; and a second optical unit comprising at least one lens to image the light beam deflected and scanned by the optical deflector onto a scanning target surface, wherein the following expression is satisfied $$|\beta m| > |\beta s| \text{ and } 0.05\left(\frac{\beta s}{\beta m}\right)^2 < 0.5$$

in order to reduce a tolerance sensitivity in the sub scanning direction, where, $\beta m$ represents a magnification of an optical system of the light scanning unit in the main scanning direction, and $\beta s$ represents a magnification of the optical system of the light scanning unit in the sub scanning direction.

2. The light scanning unit of claim 1, wherein the first optical unit comprises an anamorphic lens.

3. The light scanning unit of claim 1, wherein the first optical unit is formed of plastic.

4. The light scanning unit of claim 1, wherein a diffraction pattern is formed on at least one surface of the first optical unit.

5. The light scanning unit of claim 4, wherein the diffraction pattern of the first optical unit is formed in a saw-toothed shape or a stair shape.

6. The light scanning unit of claim 5, wherein a diffraction surface of the first optical unit, on which the diffraction pattern is formed, has a circular shape or an oval shape.

7. The light scanning unit of claim 5, wherein the diffraction pattern of the first optical unit is represented by using a following phase polynomial expression $$\phi(r) = \frac{2\pi}{m\lambda}(c_1 r^2 + c_2 r^4 + c_3 r^6 + c_4 r^8),$$

where $\phi$ represents a phase of the diffraction pattern in a region at a distance r from a center of the diffraction surface, m represents a diffraction order, $\lambda$ represents a wavelength of the light beam emitted from the light source, and $c_1, c_2, c_3$, and $c_4$ represent coefficients of the phase polynomial expression.

8. The light scanning unit of claim 1, further comprising a slit for shaping the light beam.

9. An electrophotographic image forming apparatus comprising:

a photoreceptor;

a light scanning unit to scan a light beam onto a scanning target surface of the photoreceptor so as to form an electrostatic latent image; and a developing unit to provide a toner to the electrostatic latent image formed by the photoreceptor so as to develop the electrostatic latent image, wherein the light scanning unit comprises a light source to emit the light beam;

an optical deflector to deflect and scan the light beam emitted from the light source in a main scanning direction;

a first optical unit comprising a single lens to collimate the light beam emitted from the light source in the main scanning direction and focus the light beam onto a reflection surface of the optical deflector in a sub scanning direction, the first optical unit being disposed between the light source and the optical deflector, and;

a second optical unit comprising at least one lens to image the light beam deflected and scanned by the optical deflector onto the scanning target surface; and wherein the following expressions are satisfied $$|\beta m| > |\beta s| \text{ and } 0.05\left(\frac{\beta s}{\beta m}\right)^2 < 0.5$$

in order to reduce a tolerance sensitivity in the sub scanning direction, where, $\beta m$ represents a magnification of an optical system of the light scanning unit in the main scanning direction, and $\beta s$ represents a magnification of the optical system of the light scanning unit in the sub scanning direction.

10. The apparatus of claim 9, wherein the first optical unit comprises an anamorphic lens.

11. The apparatus of claim 9, wherein the first optical unit is formed of plastic.

12. The apparatus of claim 9, wherein a diffraction pattern is formed on at least one surface of the first optical unit.

13. The apparatus of claim 12, wherein the diffraction pattern of the first optical unit is formed in a saw-toothed shape or a stair shape.

14. The apparatus of claim 13, wherein a diffraction surface of the first optical unit, on which the diffraction pattern is formed, has a circular shape or an oval shape.

15. The apparatus of claim 13, wherein the diffraction pattern of the first optical unit is represented by using a following phase polynomial expression.

$$\phi(r) = \frac{2\pi}{m\lambda}(c_1 r^2 + c_2 r^4 + c_3 r^6 + c_4 r^8),$$

where $\phi$ represents a phase of the diffraction pattern in a region at a distance r from a center of the diffraction surface, m represents a diffraction order, $\lambda$ represents a wavelength of the light beam emitted from the light source, and $C_1, c_2, c_3$, and $c_4$ represent coefficients of the phase polynomial expression.

16. The apparatus of claim 9, further comprising a slit for shaping the light beam.

17. The light scanning unit of claim 1, wherein the light source is fixed with reference to a spot of the light beam in the main scanning direction without an additional adjustment member.

18. The apparatus of claim 9, wherein the light source is fixed with reference to a spot of the light beam in the main scanning direction without an additional adjustment member.

* * * * *

UNITED STATES PATENT AND TRADEMARK OFFICE
CERTIFICATE OF CORRECTION

PATENT NO. : 8,570,620 B2
APPLICATION NO. : 12/923365
DATED : October 29, 2013
INVENTOR(S) : Jong-Wuk Ku It is certified that error appears in the above-identified patent and that said Letters Patent is hereby corrected as shown below:

In the Claims

In Column 9, Line 6, In Claim 1, delete "expression is" and insert -- expressions are --, therefor.

In Column 9, Lines 9-10 (Approx.), In Claim 1, delete " $|\beta m| > |\beta s|$ and $0.05\left(\frac{\beta s}{\beta m}\right)^2 < 0.5$ " and insert -- $|\beta m| > |\beta s|$ and $0.05 < (\beta s/\beta m)^2 < 0.5,$ --, therefor.

In Column 10, Lines 13-14 (Approx.), In Claim 9, delete " $|\beta m| > |\beta s|$ and $0.05\left(\frac{\beta s}{\beta m}\right)^2 < 0.5$ " and insert -- $|\beta m| > |\beta s|$ and $0.05 < (\beta s/\beta m)^2 < 0.5,$ --, therefor.

In Column 10, Line 49, In Claim 15, delete "$C_1$," and insert -- $c_1$, --, therefor.

Signed and Sealed this
Third Day of June, 2014

Michelle K. Lee
*Deputy Director of the United States Patent and Trademark Office*